(12) United States Patent
Deniau et al.

(10) Patent No.: US 9,120,357 B2
(45) Date of Patent: Sep. 1, 2015

(54) METHODS, SYSTEMS AND DEVICES FOR INTEGRATION OF TIRE PRESSURE MONITORING SENSORS WITH A TIRE PRESSURE MONITORING SYSTEM

(71) Applicant: Continental Automotive Systems, Inc., Auburn Hills, MI (US)

(72) Inventors: Jean Christophe Deniau, Fenton, MI (US); Brian J Farrell, Troy, MI (US); Matthew D McIntyre, New Baltimore, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 4 days.

(21) Appl. No.: 13/833,674

(22) Filed: Mar. 15, 2013

(65) Prior Publication Data

US 2014/0266661 A1 Sep. 18, 2014

(51) Int. Cl.
*B60C 23/00* (2006.01)
*B60C 23/04* (2006.01)

(52) U.S. Cl.
CPC ......... *B60C 23/0471* (2013.01); *B60C 23/0479* (2013.01)

(58) Field of Classification Search
USPC .......... 340/10.4, 10.41, 10.42, 442, 443, 444, 340/445, 446, 447, 448
See application file for complete search history.

(56) References Cited

U.S. PATENT DOCUMENTS

| | | | | |
|---|---|---|---|---|
| 3,999,431 | A * | 12/1976 | Makarainen | 73/146.5 |
| 4,978,941 | A * | 12/1990 | Brown | 340/447 |
| 5,583,482 | A * | 12/1996 | Chamussy et al. | 340/442 |
| 6,243,007 | B1 | 6/2001 | McLaughlin | |
| 6,400,261 | B1 * | 6/2002 | Starkey et al. | 340/442 |
| 6,441,727 | B1 * | 8/2002 | LeMense | 340/442 |
| 6,463,798 | B2 * | 10/2002 | Niekerk et al. | 73/146.2 |
| 6,518,876 | B1 * | 2/2003 | Marguet et al. | 340/447 |
| 6,571,617 | B2 * | 6/2003 | Van Niekerk et al. | 73/146 |
| 6,683,537 | B2 * | 1/2004 | Starkey et al. | 340/870.16 |
| 6,693,522 | B2 * | 2/2004 | Tang et al. | 340/445 |
| 6,822,582 | B2 * | 11/2004 | Voeller et al. | 340/933 |
| 6,838,985 | B2 * | 1/2005 | Ghabra et al. | 340/445 |

(Continued)

FOREIGN PATENT DOCUMENTS

| | | | |
|---|---|---|---|
| CN | 1305907 A * | 8/2001 | |
| EP | 2287018 A1 * | 2/2011 | |

(Continued)

OTHER PUBLICATIONS

International Search Report and Written Opinion dated Aug. 11, 2014 relating to PCT/US2014/025700, 10 pages.

*Primary Examiner* — Paul Obiniyi

(57) ABSTRACT

The present invention relates to methods, systems and devices for integration of tire pressure monitoring sensors with a tire pressure monitoring system utilizing a telecommunication device. In one exemplary embodiment, the present invention provides a method of integrating a tire pressure monitoring sensor with a tire pressure monitoring system of a vehicle. The method includes the step of establishing a communication link between a telecommunication device and a tire pressure monitoring sensor, the communication link including a low frequency transmission device. The method further includes transmitting a signal through the communication link to cause the tire pressure monitoring sensor to communicate with a tire pressure monitoring system of a vehicle.

24 Claims, 7 Drawing Sheets

(56) References Cited

U.S. PATENT DOCUMENTS

| | | | |
|---|---|---|---|
| 6,879,252 B2* | 4/2005 | DeZorzi et al. | 340/505 |
| 6,904,796 B2* | 6/2005 | Pacsai et al. | 73/146.8 |
| 7,026,953 B2* | 4/2006 | Fujii | 340/870.16 |
| 7,032,443 B2* | 4/2006 | Moser | 73/146.5 |
| 7,145,445 B2* | 12/2006 | Tranchina | 340/447 |
| 7,286,859 B2* | 10/2007 | Cunningham et al. | 455/574 |
| 7,367,227 B2* | 5/2008 | Stewart et al. | 73/146 |
| 7,456,732 B2* | 11/2008 | Tranchina | 340/447 |
| 7,511,609 B2* | 3/2009 | Hammerschmidt | 340/447 |
| 7,528,705 B2* | 5/2009 | Brown et al. | 340/442 |
| 7,589,619 B2* | 9/2009 | DeKeuster et al. | 340/442 |
| 8,165,541 B2* | 4/2012 | Yamashita et al. | 455/118 |
| 8,380,460 B2* | 2/2013 | Miller et al. | 702/150 |
| 8,724,526 B2* | 5/2014 | Abraham et al. | 370/295 |
| 8,736,435 B2* | 5/2014 | Kanenari | 340/447 |
| 8,742,914 B2* | 6/2014 | Deniau et al. | 340/447 |
| 2002/0092345 A1* | 7/2002 | Van Niekerk et al. | 73/146 |
| 2002/0092346 A1* | 7/2002 | Niekerk et al. | 73/146.2 |
| 2002/0092347 A1* | 7/2002 | Niekerk et al. | 73/146.2 |
| 2002/0113691 A1* | 8/2002 | LeMense | 340/442 |
| 2002/0140574 A1* | 10/2002 | Starkey et al. | 340/870.16 |
| 2003/0046993 A1* | 3/2003 | Fujii | 73/146.5 |
| 2003/0071723 A1* | 4/2003 | Tang et al. | 340/445 |
| 2003/0112138 A1* | 6/2003 | Marguet et al. | 340/447 |
| 2003/0164030 A1* | 9/2003 | Walker et al. | 73/146 |
| 2003/0164031 A1* | 9/2003 | Nantz et al. | 73/146 |
| 2003/0164759 A1* | 9/2003 | Nantz et al. | 340/442 |
| 2003/0179085 A1* | 9/2003 | Ghabra et al. | 340/445 |
| 2003/0179086 A1* | 9/2003 | Nantz et al. | 340/445 |
| 2004/0095233 A1* | 5/2004 | DeZorzi et al. | 340/446 |
| 2004/0099055 A1* | 5/2004 | Komatsu et al. | 73/146 |
| 2004/0140887 A1* | 7/2004 | Klamer | 340/442 |
| 2004/0164140 A1* | 8/2004 | Voeller et al. | 235/375 |
| 2004/0206167 A1* | 10/2004 | Pacsai et al. | 73/146 |
| 2005/0057348 A1* | 3/2005 | Hammerschmidt | 340/445 |
| 2005/0099274 A1* | 5/2005 | Tranchina | 340/426.15 |
| 2005/0156722 A1* | 7/2005 | McCall et al. | 340/447 |
| 2005/0179530 A1* | 8/2005 | Stewart et al. | 340/447 |
| 2006/0006994 A1* | 1/2006 | Moser | 340/448 |
| 2006/0015225 A1* | 1/2006 | McQuade et al. | 701/29 |
| 2006/0017554 A1* | 1/2006 | Stewart et al. | 340/447 |
| 2006/0049693 A1* | 3/2006 | Abraham et al. | 307/10.1 |
| 2006/0071766 A1* | 4/2006 | O'Brien et al. | 340/442 |
| 2006/0091996 A1* | 5/2006 | Conner et al. | 340/5.64 |
| 2006/0111062 A1* | 5/2006 | Cunningham et al. | 455/152.1 |
| 2006/0114531 A1* | 6/2006 | Webb et al. | 359/15 |
| 2006/0220815 A1* | 10/2006 | Thomas | 340/447 |
| 2007/0040660 A1* | 2/2007 | Miller et al. | 340/442 |
| 2007/0046427 A1* | 3/2007 | Ghabra et al. | 340/5.61 |
| 2007/0090928 A1* | 4/2007 | Deniau et al. | 340/10.52 |
| 2008/0164846 A1* | 7/2008 | DeKeuster et al. | 320/115 |
| 2008/0164988 A1* | 7/2008 | DeKeuster et al. | 340/442 |
| 2008/0247447 A1* | 10/2008 | Abraham et al. | 375/222 |
| 2009/0160629 A1* | 6/2009 | Shimura | 340/431 |
| 2009/0224901 A1* | 9/2009 | Yu | 340/447 |
| 2009/0267751 A1 | 10/2009 | Wittliff | |
| 2009/0311977 A1* | 12/2009 | Yamashita et al. | 455/91 |
| 2010/0023142 A1* | 1/2010 | Julian et al. | 700/94 |
| 2010/0066524 A1* | 3/2010 | Yu | 340/447 |
| 2010/0271189 A1* | 10/2010 | Miller et al. | 340/431 |
| 2011/0010389 A1* | 1/2011 | Shaffer et al. | 707/770 |
| 2011/0043354 A1* | 2/2011 | Shepler et al. | 340/447 |
| 2012/0013458 A1* | 1/2012 | Kanenari | 340/447 |
| 2012/0022801 A1* | 1/2012 | Miller et al. | 702/42 |
| 2013/0038440 A1* | 2/2013 | Deniau et al. | 340/447 |
| 2013/0131894 A1* | 5/2013 | Oakes | 701/2 |

FOREIGN PATENT DOCUMENTS

| | | | |
|---|---|---|---|
| GB | 2387467 A | * | 10/2003 |
| GB | 2486168 A | | 6/2012 |
| WO | WO 2005070707 A1 | * | 8/2005 |

* cited by examiner

METHODS, SYSTEMS AND DEVICES FOR INTEGRATION OF TIRE PRESSURE MONITORING SENSORS WITH A TIRE PRESSURE MONITORING SYSTEM

RELATED APPLICATIONS

The present application is a continuation-in-part of, and claims priority to, U.S. non-provisional patent application Ser. No. 13/358,814, to Deniau et al., filed Jan. 26, 2012, and U.S. non-provisional patent application Ser. No. 13/358,828, to Deniau et al., filed Jan. 26, 2012, both of which claim priority to U.S. non-provisional patent application Ser. No. 12/166,626, to Deniau et al., filed Jul. 2, 2008, now abandoned, which further claims priority to U.S. provisional patent application No. 60/958,203, to Deniau et al., filed Jul. 3, 2007, the contents of all are hereby incorporated by reference, in their entirety, for all purposes.

FIELD OF THE INVENTION

The present invention relates to methods, systems and devices for integration of tire pressure monitoring sensors with a tire pressure monitoring system utilizing a telecommunication device.

BACKGROUND OF THE INVENTION

Commercial and non-commercial vehicles now have tire pressure monitoring systems (TPMS) which include a central module, integrated or in communication with an electronic control unit of the vehicle, and tire pressure monitoring sensors (TPM sensors) for each vehicle wheel unit. In general, the TPM sensors monitor tire pressure within a respective tire and transmits a wireless signal to the central module which is indicative of tire pressure. Should the sensed pressure be outside of an acceptable range or a substantial change in tire pressure occur, an alarm is generated and transmitted to the user of the vehicle.

Over time, TPM sensors require replacement by service technicians due to damage, depleted battery or otherwise. This requires installation and integration of new TPM sensors with a TPMS of a vehicle. During this process, in one configuration, the technician places the vehicle in a learning mode requiring each TPM sensor to be triggered for identification purposes. The technician then sequentially triggers each sensor of a wheel unit, utilizing a TPMS tool, causing each sensor, new or existing, to transmit a wireless signal to a control module of the TPMS. These tools communicate with a sensor through low frequency signals which communicate with the TPMS through a higher frequency radio signal. The control module records the identification number of each signal so as to interpret the location of TPM sensor data during operation thereof.

More recently, certain manufacturers have offered TPM sensors that can be configured, through flash programming or program selection, by a service technician with suitable operating software for a particular make, model and year of a vehicle. Unfortunately, this requires the purchase and maintenance of expensive tools, such as the TECH400SD, sold by Bartec USA at www.bartecusa.com, or otherwise. The purchase and maintenance of TPM sensor configuration tools can be considerable as service stations should maintain one configuration tool for a certain amount of vehicles anticipated to be serviced. Accordingly, the greater number of anticipated clientele, the more configuration tools must be on hand and maintained. Furthermore, the substantial cost of configuration tools effectively eliminates individuals from servicing their own TPMS.

In another aspect, with the continual expansion of the TPMS market, due to increasing numbers of vehicles being sold with TPMS, TPM sensor tools must be continually updated to include not only new TPMS models introduced every year, but also improved software for existing TPM sensors. Accordingly, existing configuration tools must have new memory modules purchased and installed to include the new TPMS data. Alternatively, each configuration tool must be connected to a computer in order to download program software updates, via the internet, or otherwise. In either instance, time must be dedicated for the accessing and installation of updated program software for each sensor tool.

SUMMARY OF THE INVENTION

The present invention provides improved methods, systems and devices for generating communication between new or existing TPM sensors with existing TPMS of a vehicle. The present invention further provides improved methods, systems and devices for integrating new TPM sensors with existing TPMS. The present invention further provides improved methods, systems and devices for configuring or programming replacement TPM sensors so as to communicate and be integrated with an existing TPMS.

The features of the present invention are predicated, in part, through the utilization of everyday electronic devices to cause communication, configuration and/or programming of TPM sensors with existing TPMS. More specifically, the features of the present invention are predicated, in part, through the use of telecommunication devices, such as smart phones or otherwise, for the integration of TPM sensors with existing TPMS. The features of the present invention are further predicated, in part, upon the use of a low frequency transmission device that is operable to communicate with an existing telecommunication device and for communication with TPM sensors so as to cause communication between the TPM sensor and a TPMS, configure or program a TPM sensor to function with a TPMS, or combinations thereof. In one configuration, the low frequency transmission device is further configured for communication with a TPMS control unit, electronic control unit of a vehicle or both, for transmitting and receiving information pertaining to one or more TPM sensors. Through the features of the present invention, the use and cost of additional TPMS components and downtime for maintaining the same are greatly reduced.

In view of the foregoing, in a first aspect, the present invention provides a method of integrating a tire pressure monitoring sensor with a tire pressure monitoring system of a vehicle. The method includes the step of establishing a communication link between a telecommunication device and a tire pressure monitoring sensor, the communication link including a low frequency transmission device. The method further includes transmitting a signal through the communication link to cause the tire pressure monitoring sensor to communicate with a tire pressure monitoring system of a vehicle.

In another aspect, the present invention provides a system for integrating a tire pressure monitoring sensor with a tire pressure monitoring system of a vehicle The system includes a telecommunication device having a memory device with suitable software for communicating with a tire pressure monitoring sensor. The system further includes a low frequency transmission device in communication with the telecommunication device through a first communication link.

The low frequency transmission device is configured to form a second communication link with a tire pressure monitoring sensor, wherein through the low frequency transmission device the telecommunication device is configured to cause the tire pressure monitoring sensor to communicate with a tire pressure monitoring system of a vehicle.

In another aspect, the present invention provides a handheld tool configured to integrate a tire pressure monitoring sensor with a tire pressure monitoring system of a vehicle. The tool includes a telecommunication device and a low frequency transmission device. The tool further includes a memory device having software instructions for generating a communication link between the low frequency transmission device and a tire pressure monitoring sensor. The software instructions are configured to cause the tire pressure monitoring sensor to communicate with a tire pressure monitoring system of a vehicle.

In another aspect, the present invention provides a computer-readable memory device storing computer program instructions which when executed by a computer comprising at least one processor results in: i) generating a communication link between a telecommunication device and a low frequency transmission device; and ii) transmitting a signal through the communication link to cause the tire pressure monitoring sensor to communicate with a tire pressure monitoring system of a vehicle.

These and other features of the present invention can be best understood from the following specification and drawings, the following of which is a brief description.

DETAILED DESCRIPTION OF THE INVENTION

Figure 1:
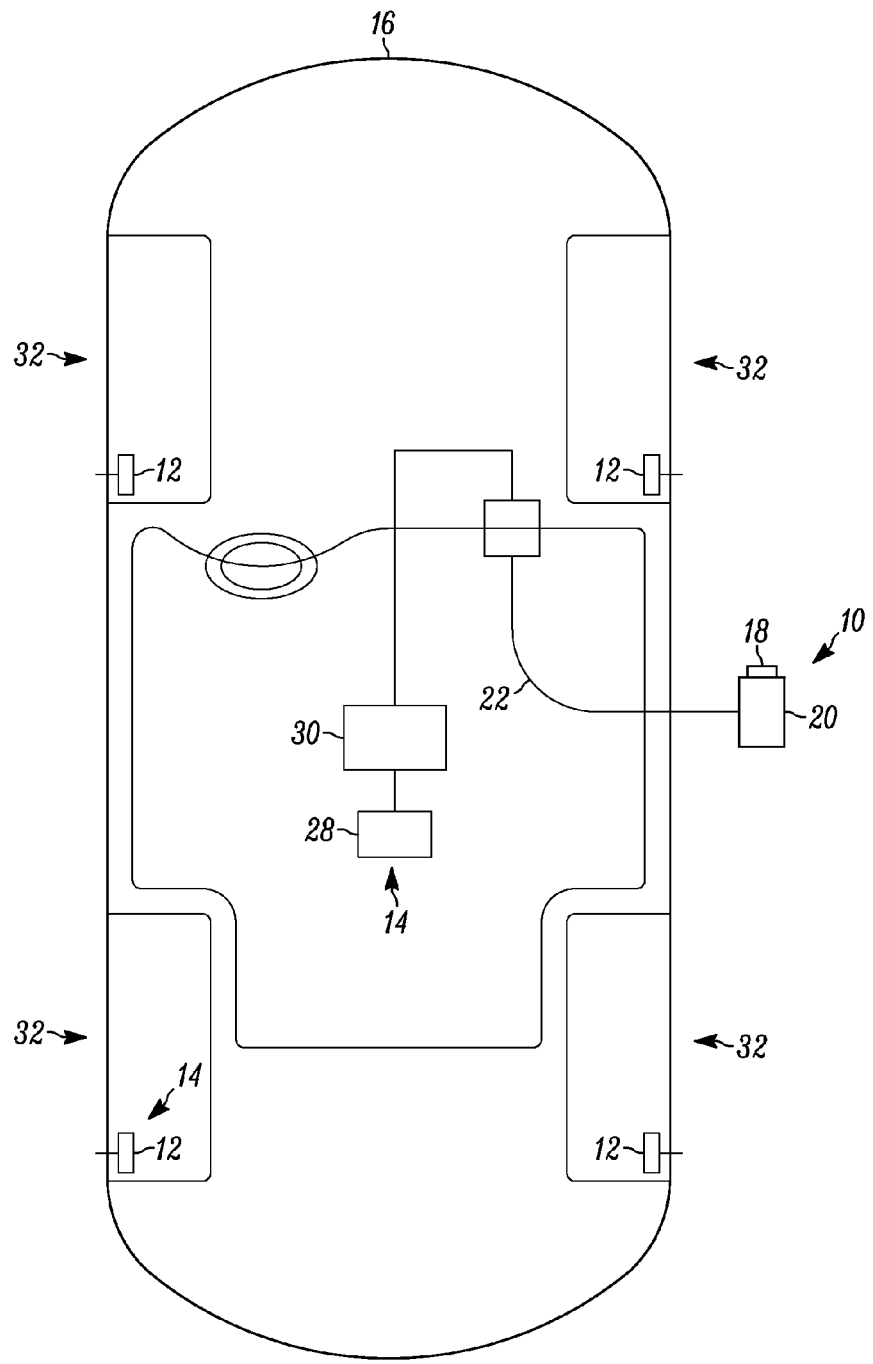
FIG. 1 illustrates a schematic view of an exemplary TPM sensor integration system for integration of a tire pressure monitoring sensor with a tire pressure monitoring system according to the teachings of the present invention.
Figure 7:
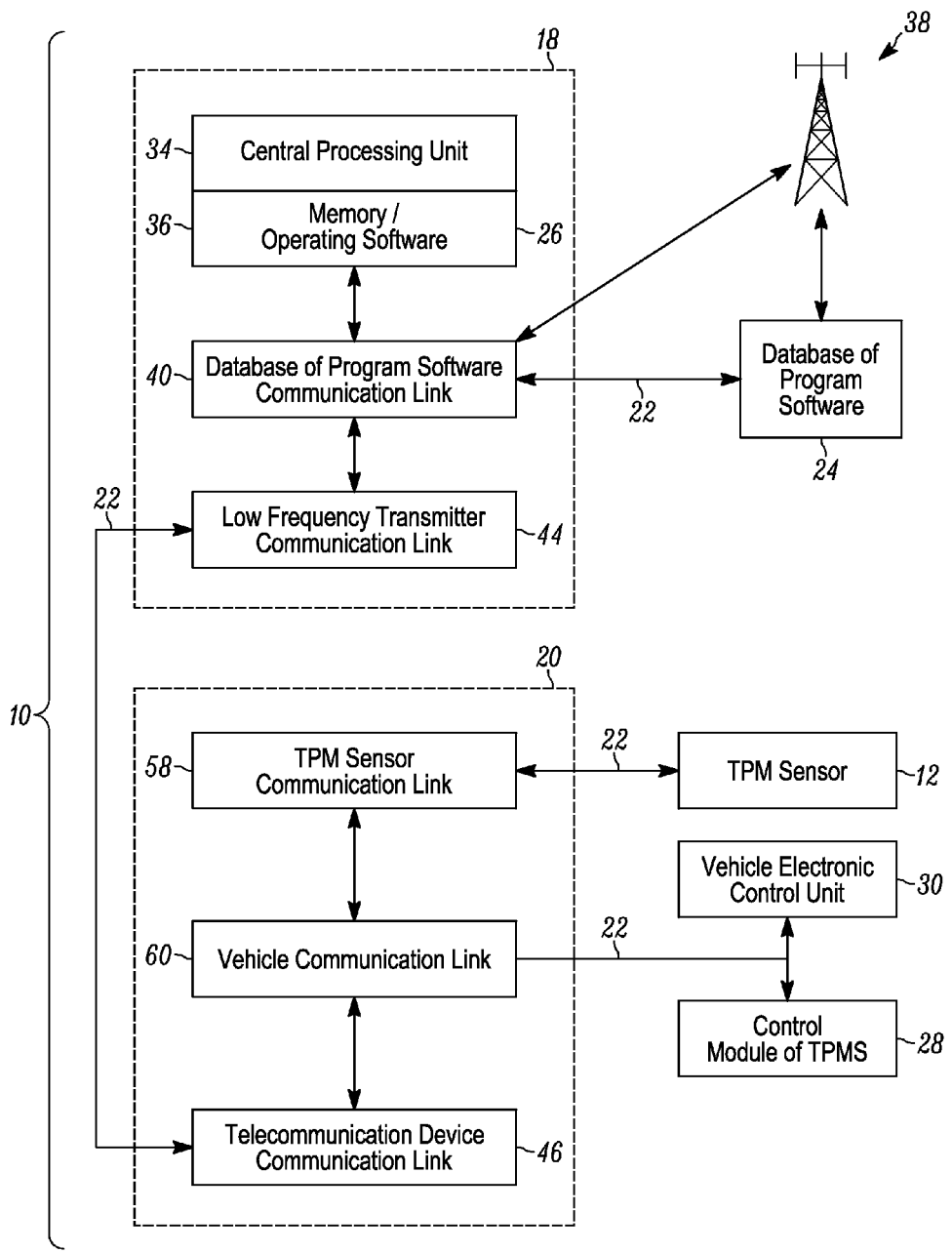
FIG. 7 illustrates a schematic view of an exemplary TPM sensor integration system for integration of a tire pressure monitoring sensor with a tire pressure monitoring system according to the teachings of the present invention.

Referring to FIGS. 1 and 7, exemplary embodiments of a TPM sensor integration system 10 for a tire pressure monitoring (TPM) sensor 12 of a tire pressure monitoring system (TPMS) 14 of a vehicle 16 are shown. The TPM sensor integration system 10 includes a telecommunication device 18 in communication with a low frequency transmission device 20, through a physical or wireless connection 22. In one exemplary embodiment, the telecommunication device 18 includes, or is in communication with, a database of program software 24 for TPM sensors, through a physical or wireless connection 22. The telecommunication device 18 further includes operating software 26 for: i) establishing communication links with various components of the TPM sensor integration system 10, ii) generation of a signal to cause a TPM sensor to communicate with a TPMS 14, iii) selection of a program software for use by the TPM sensor 12 from the database of program software 24, iv) programming or configuring a TPMS sensor 12, through the low frequency transmission device 20, or otherwise. In several exemplary embodiments, the telecommunication device 18, through the low frequency transmission device 20, is in further communication with a component of a vehicle, such as a control module 26 of the TPMS 14, an electronic control unit 28 of the vehicle 16, or both, through a physical or wireless connection 22. Through the connection of the telecommunication device 18 to the vehicle 16, it is possible to communicate information pertaining to a TPM sensor 12 of a wheel unit 30, information pertaining to a vehicle, or otherwise.

In one exemplary method, the operation software 26 of the telecommunication device 18 forms a communication link between the telecommunication device 18 and TPM sensor 12. The operation software 26 further transmits a signal, via a physical or wireless connection 22, to the TPM sensor to cause the sensor to be triggered. Triggering of the sensor 12 results in the generation of a wireless signal, by the sensor, which is received by a control module 28 of the TPMS. This signal includes various data information pertaining to a wheel unit and in one exemplary embodiment identification information of the sensor.

In another exemplary method, the operation software 26 is adapted to configure a sensor 12 for use with a TPMS of a vehicle 16. In this configuration, the operation software causes a telecommunication device 18 to transmit a signal, via a physical or wireless connection 22, to the sensor 12 indicating operation parameters of the sensor, such as transmission frequency, arrangement of data, transmission periods, etc. In one configuration, the operation parameters are based upon original equipment manufacturer specifications for sensors of a particular tire pressure monitoring system.

In another exemplary method, the operation software 26 is further configured to provide access and selection of a suitable program software, from the database of program software 24, that is compatible with the TPMS 14 of the vehicle 16. In one particular configuration, the operation software 26 of the telecommunication device 18 is further configured to provide the ability to enter or download vehicle identification information, such as a make, model and/or year of manufacture of a vehicle, vehicle identification number (VIN), or otherwise. The suitable program software from the database of program software 24 is further downloaded to the low frequency transmission device 20, through the physical or wireless connection 22. The operation software 26 then causes the low frequency transmission device 20 to program one or more TPM sensors 12 through a physical or wireless connection 22. The operation software 26 then causes the low frequency transmission device 20 to communicate with the control module 28 of the TPMS 14 to indicate pertinent information, such as identification number of the programmed sensor, wheel unit location or otherwise.

In any of the above reference exemplary methods, the triggered, configured or programmed TPM sensor 12 is mounted to the wheel unit 32, either before or after triggering, configuring or programming, and communicates with the control module 28 of the TPMS 14, via 315 MHz or 433.92 MHz or any other allowed radio signals, to begin monitoring air pressure of the wheel unit.

Figure 8:
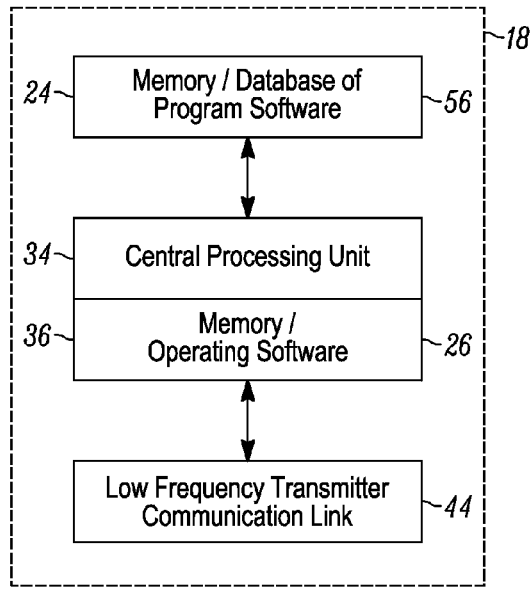
FIG. 8 illustrates a schematic view of an exemplary telecommunication device according to the teachings of the present invention.

As indicated herein, the telecommunication device 18 includes operation software 26 for effectuating one or more the features of the present invention. With reference to FIGS. 7 and 8, in one exemplary embodiment the telecommunication device 18 includes a central processing unit 34 and computer-readable memory device 36 for storing the operation software 26. These, as well as traditional cell phones, often include both integrally formed memory devices and external memory devices connectable and/or insertable into the phone that can be configured to store the operation software 26. In one exemplary embodiment, the telecommunication device 18 comprises a smart phone having more advanced computing and connectivity capability than more traditional cellular phones. Non-limiting examples of suitable smart phones include iPhones, Android phones, BlackBerry phones, or otherwise.

Figure 2:
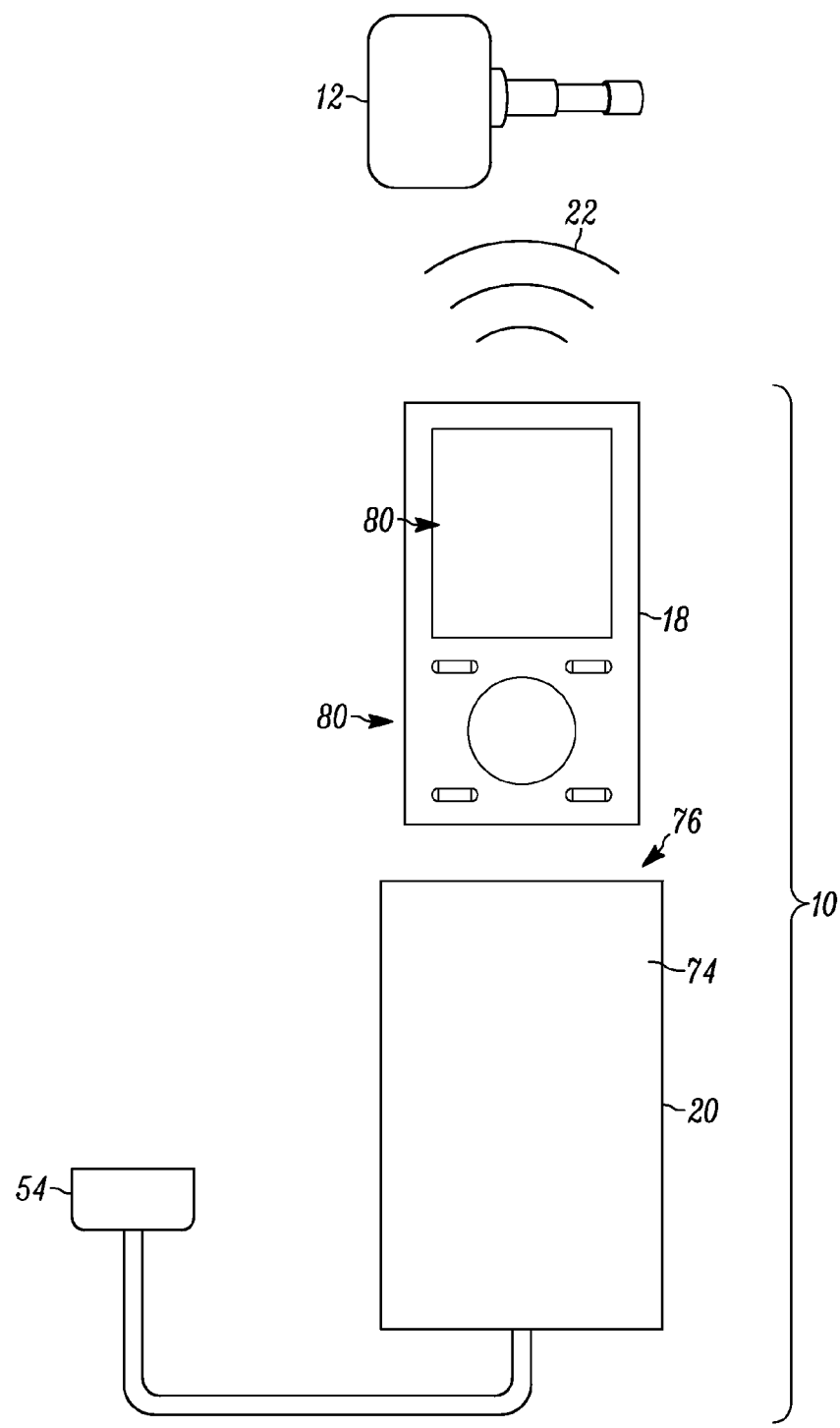
FIG. 2 illustrates an exploded top elevational view of an exemplary TPM sensor integration system for integration of a tire pressure monitoring sensor with a tire pressure monitoring system according to the teachings of the present invention.
Figure 3:
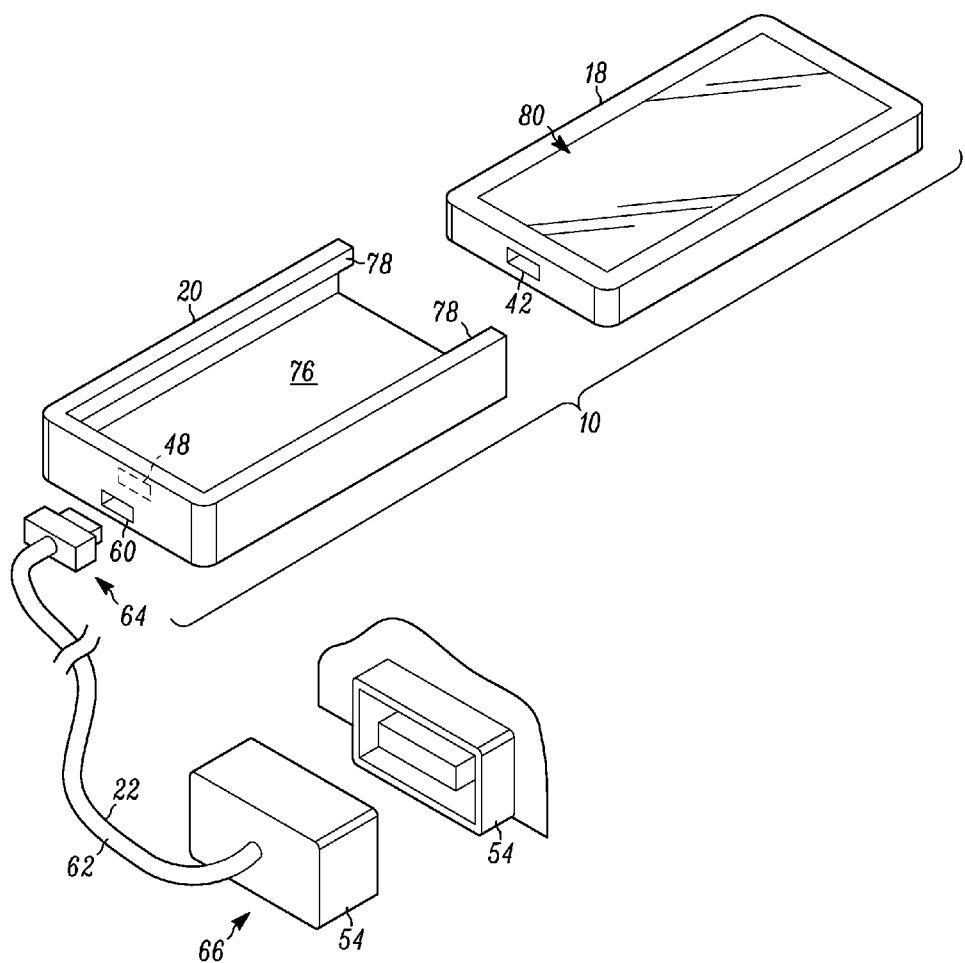
FIG. 3 illustrates an exploded perspective view of an exemplary TPM sensor integration system for integration of a tire pressure monitoring sensor with a tire pressure monitoring system according to the teachings of the present invention.
Figure 4:
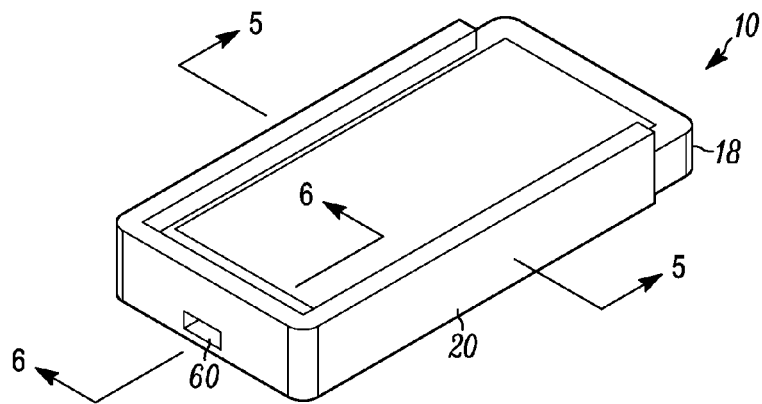
FIG. 4 illustrates a perspective view of the exemplary TPM sensor integration system shown in FIG. 3.

In greater detail, referring to FIGS. 2 through 4, several exemplary embodiments of the TPM sensor integration system 10 of the present invention are shown. In one exemplary embodiment, the TPM sensor integration system 10 includes a telecommunication device 18 and low frequency transmission device 20 that are in communication with one another through a physical or wireless connection 22. In one particular exemplary embodiment, the telecommunication device 18 and low frequency transmission device 20 are in close proximity to one another. In another particular exemplary embodiment, the telecommunication device 18 and low frequency transmission device 20 are physically connected to one another.

The telecommunication device 18 includes one or more communications links, formed through a physical or wireless connection 22, for transferring data to and from other electronic devices. In several exemplary embodiments, the transfer of data is advantageous for triggering a TPM sensor 12 through a low frequency transmission device 20, configuring a TPMS sensor 12 through a low frequency device 20, downloading program software from the database of program software 24 to a low frequency transmission device 20, or otherwise. Still further, this transfer is advantageous for sending and receiving information to and from a control module 22 of a TPMS 14, and electronic control unit 24 of a vehicle 16, or otherwise.

The telecommunication device 18 includes suitable transmitter/receiver and software for forming a connection with a cellular network 38. Examples of such cellular networks 38 include, without limitation, Verizon, T-mobile, Sprint, AT&T, or otherwise. In one exemplary embodiment, referring to FIG. 7, the database of program software 24 is also connected to the cellular network 38. In this configuration, the operation software 26 of the telecommunication device 18 is configured to establish a suitable connection between a database of program software communication link 40, which may comprise the suitable cellular transmitter/receiver, and the database of program software 24, through the cellular network 38. This connection provides the ability to download one or more program software from the database of program software 24 to the telecommunication device 18, through the cellular network 38.

In another exemplary embodiment, still referring to FIG. 7, the telecommunication device 18 includes a database of program software communication link 40 that is configured for establishing a physical or wireless connection 22 directly with the database of program software 24. In this configuration, it is contemplated that the telecommunication device includes a physical connector or transmitter/receiver for forming the physical or wireless connection 22 with the database of program software.

For example, in one exemplary embodiment, referring to FIGS. 3 though 6, the telecommunication device 18 includes physical connector 42 for transferring data to or from other electrical devices, such as the database of program software 24, the low frequency transmission device 20, vehicle 16, computer or otherwise. Such physical connectors 42 are commonly installed on smart phones and other cellular phones, wherein the physical or wireless connection 22 includes a wire having a first end with a connector suitable for engagement with the physical connector 42 and a second end having a universal serial bus (USB) connector, a mini-USB connector, or otherwise, for connection to another electrical device.

In another exemplary embodiment, referring again to FIG. 7, the telecommunication device 18 includes a low frequency communication link 44 that is configured for establishing a physical or wireless connection 22 with the low frequency transmission device 20 through a telecommunication device communication link 46. The connection between the telecommunication device 18 and low frequency transmission device 20 allows for communication between the telecommunication device and a TPM sensor 12, vehicle 16, or otherwise, through the low frequency transmission device. The connection between the telecommunication device 18 and low frequency transmission device 20 also allows for the transfer of one or more selected program software from the database of program software 24 to a TPM sensor 12. The telecommunication device 18 includes a physical connector or transmitter/receiver for forming the physical or wireless connection 22 with the low frequency transmission device 20.

For example, in one exemplary embodiment, referring to FIGS. 3 though 6 and 7, the low frequency communication link 44 includes physical connector 42 that is configured for engagement with a corresponding physical connector 48 of the telecommunication device communication link 46 of the low frequency transmission device 20. As previously indicated herein, the physical connector 42 may comprise physical connectors that are commonly installed on smart phones and other cellular phones and the physical connector 48 may comprise a corresponding connector to physical connector 42.

Figure 5:
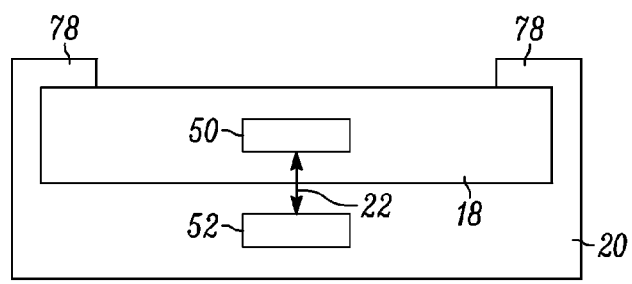
FIG. 5 illustrates a cross-sectional view of the exemplary TPM sensor integration system of FIG. 4 taken along lines 5-5.
Figure 6:
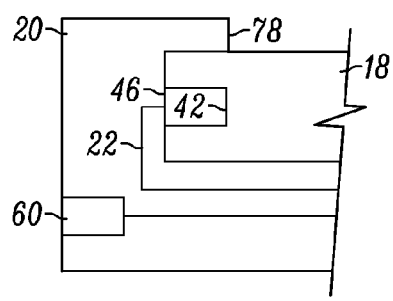
FIG. 6 illustrates a partial cross-sectional view of the exemplary TPM sensor integration system of FIG. 4 taken along lines 6-6.

In another exemplary embodiment, referring to FIG. 5, the low frequency communication link 44 includes a wireless transmitter/receiver 50 that is configured to communication with a wireless transmitter/receiver 52 of the low frequency transmission device 20 to form the physical or wireless connection 22. The wireless link may comprise: very short range wireless link such as less than an inch, short range wireless link such as a couple of inches, mid-range wireless link such as several feet, long range wireless link such as up to about 50 feet, or longer. For example, in one exemplary embodiment, the wireless link comprises Near Field Communication, Bluetooth®, Wi-Fi, Mobile Broadband or other short or long range wireless links commonly incorporated into cellular phones. It is contemplated that the telecommunication device 18 may include a physical connector 42, wireless transmitter/receiver 50 or both.

In another exemplary embodiment, referring to FIG. 7, it is contemplated that the telecommunication device 18 is configured for communication with other electronic devices, such as a control module 28 of the TPMS 14, electronic control unit 30 of the vehicle 16, or otherwise. In this exemplary embodiment, the telecommunication device 18 forms a physical or wireless connection 22 with the control module 28, electronic control unit 30 or otherwise. For example, referring to FIG. 3, in one configuration the telecommunication device 18 is in communication with the control module 28, electronic control unit 30, or otherwise, through the physical connector 42. In this configuration, the low frequency transmission device 20 may be interposed or comprise a portion of the communication link 62. In one particular configuration, the telecommunication device 18 is connected to the control module 28, electronic control unit 30, or otherwise, through an on-board diagnostic connector 54. In another exemplary configuration, referring to FIG. 5, the telecommunication device 18 is in communication with the control module 28, electronic control unit 30, or otherwise, through the wireless transmitter/receiver 50.

As previously indicated, in one exemplary embodiment, the TPM sensor integration system 10 further includes a database of program software 24 for selection and installation onto a memory device of a TPM sensor 12. The telecommunication device 18 includes or is in communication with the database of program software 24 and is configured for forming a communication link with the low frequency transmission device 20 and installing a selected program software on the memory device of one or more TPMS sensors 12 through the low frequency transmission device.

In one exemplary embodiment, referring to FIG. 7, the telecommunication device 18 is in communication with a database of program software 42, which is disposed remote from the telecommunication device, through a physical or wireless connection 22. In another exemplary embodiment, referring to FIG. 8, the telecommunication device includes a database of program software 24 disposed on an internal memory module, such as computer-readable memory device 36, another computer readable memory device 56 or otherwise. In still another exemplary embodiment, referring to FIG. 9, the database of program software 24 is disposed on an internal memory device of the TPM sensor 12. In any of the exemplary embodiments, the operation software 26 of the telecommunication device 18 is configured to compare identification information of the vehicle 16, e.g. make, model, year, VIN and/or otherwise, and select a suitable software program, from the database of program software 24, for use with a TPMS of the particular vehicle. Accordingly, in one exemplary embodiment, each program software for the TPM sensors are correlated with identification information of the vehicle 16.

In one exemplary embodiment, referring to FIG. 3, the telecommunication device 18 further includes a user interface 80 for performing or initiating the features of the present invention, particularly through the operation software 26. In this exemplary embodiment, the user interface 80 comprises a touch screen and various displays generated by the operating software 26. The touch screen and displays allows a user to perform various functions, such as: i) establish communication links with various electrical components, ii) transmit triggering signals to TPM sensors, iii) configuring TPM sensors, iv) programming TPM sensors, v) inputting vehicle identification information, vi) comparing vehicle identification information with a database of program software, vii) selecting and downloading a suitable program software program, viii) performing other functions or steps as described herein, ix) or otherwise.

Figure 9:
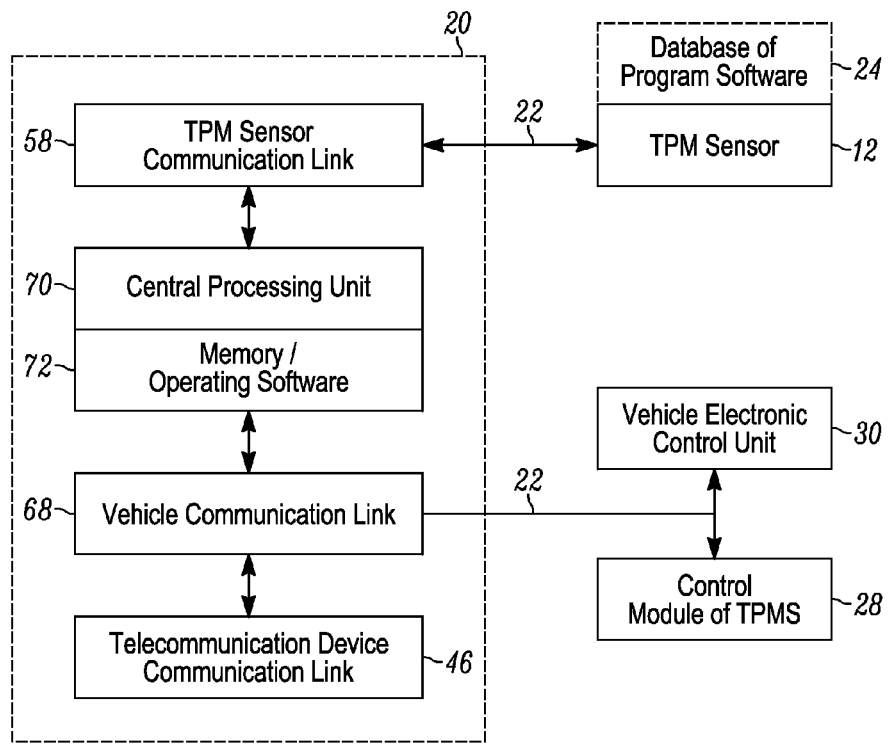
FIG. 9 illustrates a schematic view of an exemplary low frequency transmission device according to the teachings of the present invention.

In greater detail, with respect to the low frequency transmission device 18, referring to FIGS. 7 and 9, the low frequency transmission device includes a TPM sensor programming communication link 58 for programming and communication with a TPM sensor 12. The TPM sensor programming communication link 58 is configured to transmit and receive low frequency continuous and/or wave modulated signals for communicating with the TPM sensor 12, triggering the TPM sensor 12, configuring the TPM sensor 12, programming the TPM sensor 12, or otherwise. In one exemplary embodiment, the low frequency signals comprise wireless signals and more particularly radio signals. The low frequency signals being transmitted and/or received are between about 30 kHz-300 kHz and in one particular embodiment about 125 kHz. However, it is also contemplated that a physical connection may be formed between the low frequency transmission device 20 and TPM sensor 12 or even between the telecommunication device 18 and TPM sensor. Such physical connection may comprise a wired connection.

During programming, one or more TPM sensors 12 are placed proximate to the low frequency transmission device 18 and programmed through the TPM sensor programming communication link 58, via the operation software 26 of the telecommunication device 18. Through this close placement, it is further possible to communicate with the TPM sensor 12 to cause activation, determine identification code of the TPM sensor, or otherwise. It should be appreciated that communication between the low frequency transmission device 18 and TPM sensor 12 may be similar to other TPMS communication or programming or configuration tools, such as TECH400SD, sold by Bartec USA, or otherwise.

In several exemplary embodiments, referring to the embodiments shown in FIGS. 7 and 9, the low frequency transmission device 18, and hence the telecommunication device 18, is further configured for communication with a control module 28 of the TPMS 14, electronic control unit 30 of the vehicle 16, both, or otherwise, through a physical or wireless connection 22. In this configuration, it is contemplated that the low frequency transmission device 18 includes a vehicle communication link 68 for communicating with various electrical components of the vehicle 16. The vehicle communication link 68 may be configured to communicate wirelessly or through a physical connection with a control module 28, electronic control unit 30 or otherwise of a vehicle 16.

For example, referring to the exemplary embodiment shown in FIGS. 3 through 7, the low frequency transmission device 20 includes a physical connector 60 for forming a communication link with an electrical component of a vehicle, e.g. control module 22, electronic control unit 24 or otherwise. It should be appreciated that the physical connector 60 may comprise any suitable connector including any of the connectors of physical connector 42, 46 or otherwise. Further, in this configuration, a physical communication link 62 is provided through a wired configuration having a first end 64 configured for connection to physical connector 60 and a second end 66 configured for connection to a corresponding on-board diagnostic connector 54.

In another exemplary embodiment, referring to FIG. 9, the low frequency transmission device 20 includes a vehicle communication link 68 that forms a physical or wireless connection 22 with an electrical component of a vehicle, e.g. control module 28, electronic control unit 30 or otherwise. In one particular configuration, communication between low frequency transmission device 20 and vehicle 16 comprises a wireless connection. In this configuration, the wireless vehicle communication link 68 operates over a radio frequency similar to that of TPM sensors, e.g. 315 MHz or 433.92 MHz. However, other wireless frequencies are possible.

In one exemplary embodiment, the low frequency transmission device 20 includes a central processing unit 70, computer-readable memory device 72 or both for storing data, storing software, performing operational functions or otherwise. In one configuration, it is contemplated that one or more program software for TPM sensors 12 or even the database of program software 24 may be stored on the computer-readable memory device 72. In another configuration, it is contemplated that all or part of the operation software 26 for performing functions of the invention, such as described with reference to memory device 36, is stored on memory device 72. Accordingly, in view of the communication formed between the telecommunication device 18 and low frequency transmission device 20, the central processing unit 70 can be utilized to perform functions of the operation software disposed on the either or both memory device 36 or memory device 72, including but not limited to selection and downloading of program software for TPM sensors 12, forming communication with various devices including control module 28 and/or electronic control unit 30 of a vehicle 16, or otherwise.

As previously mentioned, in several exemplary embodiments, the TPM sensor integration system 10 contemplates the proximate placement of the telecommunication device 18 with respect to the low frequency transmission device 20. In several particular exemplary embodiments, referring to FIGS. 2 through 6, it is contemplated that the telecommunication device 18 and low frequency transmission device 20 are fixedly engaged with one another.

In a first configuration, with reference to FIG. 2, the low frequency transmission device 20 includes a flexible sleeve 74 configured to form an opening 76 for receiving the telecommunication device 18. In one exemplary embodiment, a friction fit is formed between the low frequency transmission device 20 and telecommunication device 18 for maintaining a physical or wireless connection 22.

In a second configuration, with reference to FIGS. 3 though 6, the low frequency transmission device 20 has opposing fingers 78 extending away from the low frequency transmission device 20 to form opening 76. The opposing fingers 76 further extend inwardly to prevent the telecommunication device 18 from moving away from the low frequency transmission device 20. In one exemplary embodiment, a friction fit is formed between the low frequency transmission device 20 and telecommunication device 18 for maintaining a physical or wireless connection 22.

Figure 10:
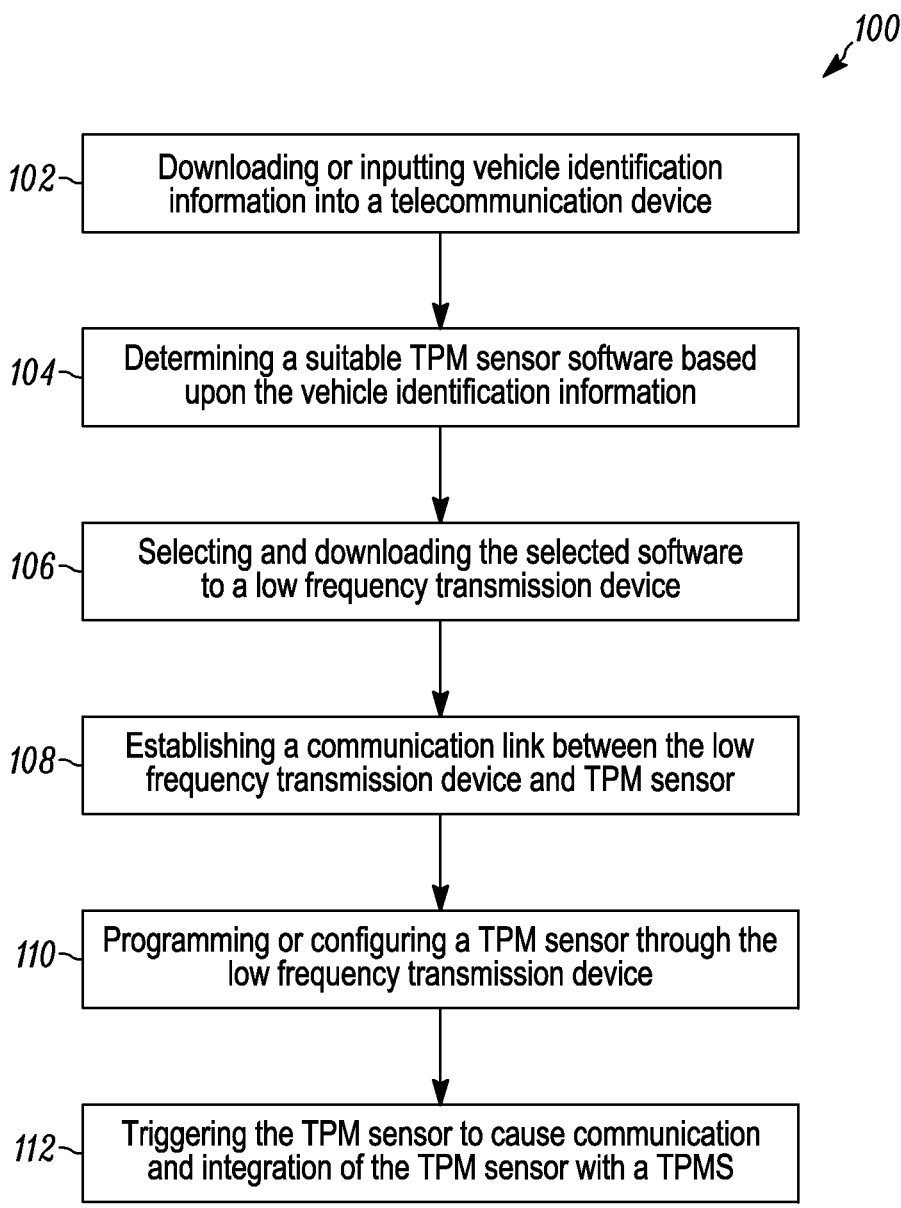
FIG. 10 illustrate a flow diagram of an exemplary method of integrating a tire pressure monitoring sensor with a tire pressure monitoring system according to the teachings of the present invention.

In view of the foregoing, referring to FIG. 10, the present invention further provides and exemplary methods of integration of a TPM sensor with a TPMS 100. The method includes downloading or inputting vehicle identification information into the telecommunication device 102. This may include inputting a make, model and/or year, or other identifiable information, such as a vehicle identification number, of a vehicle 16. Advantageously, inputting or downloading vehicle identification information is achieved through a user interface 80 of the telecommunication device 18. The method further includes determining a suitable TPM sensor software based upon the vehicle identification information 104. Through the user interface, a search is initiated of the database of program software 40 to determine the suitable TPM sensor software. In one exemplary embodiment, the user interface 80 displays the suitable software and provides the ability to select the suitable software to be programmed into a TPM sensor 12.

The method further includes selecting and downloading the selected software to a low frequency transmission device 106. In one exemplary embodiment, a user selects and downloads the selected software from the database of program software 40 to the low frequency transmission device 20, through the user interface 80. As previously mentioned, this may further include the step of downloading the software from a remotely located database of program software 40 through a cellular network 38, wireless or physical link 22 or otherwise.

The method further includes establishing a communication link between the low frequency transmission device and TPM sensor 108. This may be achieved through the use of the user interface 80 by causing the low frequency transmission device 20 to transmit and/or receive signals to and from the TPM sensor 12, as described herein.

The method further includes programming or configuring a TPM sensor through the low frequency transmission device 110. This includes downloading of a selected program software to the TPM sensor 12, selection of a suitable program software from the TPM sensor, or otherwise configuring the TPM sensor to operate according to a desired configuration, as dictated by the original equipment manufacturer of the TPMS 14 or otherwise.

The method further includes triggering the TPM sensor to cause communication and integration of the TPM sensor with a TPMS 112. During this process, the TPM sensor 14 transmits a signal to the TPMS 14 indicating an identification number of the TPM sensor and location.

It should be appreciated that more or less steps may be utilized with the method of integration of a TPM sensor with a TPMS 100, of the present invention, as shown and described herein.

While the invention has been described with reference to a preferred embodiment it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of integrating a tire pressure monitoring sensor with a tire pressure monitoring system of a vehicle, comprising the steps of: establishing a first communication link between a portable mobile wireless device disposed outside the vehicle and moveable outside the vehicle by a user to different tires of the vehicle and a low frequency transmission device disposed outside the vehicle, and establishing a second communication link between the low frequency transmission device and a tire pressure monitoring sensor disposed at the vehicle tire, the communication link including a low frequency transmission device, the portable mobile wireless device being configured to selectively couple and decouple to the low frequency transmission device; and transmitting a signal through the first communication link and the second communication link to program the tire pressure monitoring sensor and cause the tire pressure monitoring sensor to communicate with a tire pressure monitoring system of a vehicle;

generating a third communication link between the low frequency transmission device and an electronic control unit disposed within the vehicle, further comprising the step of downloading the identification information of the tire pressure monitoring sensor through the first and second communication links formed between the portable mobile wireless device and tire pressure monitoring sensor, programming the portable mobile wireless device with software capable of determining a suitable program software for a tire pressure monitoring sensor of a particular vehicle; selecting a suitable program software from a database of program software with the portable mobile wireless device based upon identification information of the vehicle; and causing the tire pressure monitoring sensor to operate according to the selected suitable program software, wherein the identification information comprises the vehicle make, model, year of manufacture, vehicle identification number or combination thereof, wherein the portable mobile wireless device includes a user interface for initiating communication with a tire pressure monitoring sensor, communication with an electronic control unit of a vehicle, or both.

2. The method of claim 1, wherein the third communication link formed between the portable mobile wireless device and the electronic control unit comprises a physical connection.

3. The method of claim 1, further comprising the step of downloading an identification information of one or more tire pressure monitoring sensors from the vehicle to the portable mobile wireless device.

4. The method of claim 1, further comprising the step of uploading identification information of the tire pressure monitoring sensor to the vehicle.

5. The method of claim 1, wherein the portable mobile wireless device and the low frequency transmission device are physically connected, connected through a near field communication connection or wirelessly connected.

6. The method of claim 1, further comprising the step of generating a fourth communication link between the portable mobile wireless device and the database of program software, and downloading the selected suitable program software to the portable mobile wireless device through the fourth communication link formed between the portable mobile wireless device and database of program software.

7. The method of claim 1, wherein the database of program software is stored on a memory unit of the portable mobile wireless device.

8. The method of claim 7, further comprising the step of programming the tire pressure monitoring sensor with the selected suitable program software.

9. The method of claim 8, wherein the step of programming of the tire pressure monitoring sensor is achieved through a low frequency wireless connection formed between the portable mobile wireless device and the tire pressure monitoring sensor.

10. The method of claim 1, wherein the database of program software is stored on a memory unit of the tire pressure monitoring sensor.

11. The method of claim 10, wherein the portable mobile wireless device indicates to the tire pressure monitoring sensor which suitable program software from the database of program software the tire pressure monitoring sensor is to utilize for operation.

12. The method of claim 1, further comprising the step of determining identification information of the vehicle and comparing the identification infatuation with the database of program software to determine a suitable program software for the tire pressure monitoring sensor for the vehicle.

13. The method of claim 1, wherein the selected suitable program software includes operation commands, transmission protocol for a tire pressure monitoring sensor, or both.

14. A tire pressure monitoring sensor for a wheel unit comprising: a receiver for receiving programmed instructions from a low frequency transmission device over a first communication link, a portable mobile wireless device being configured to selectively couple and de-couple to the low frequency transmission device and provide the instructions, the portable mobile device and the low frequency transmission device being disposed outside the vehicle; and a transmitter for transmitting over a second communication link tire pressure information from the tire pressure monitoring sensor to an electronic control unit that is disposed within the vehicle memory device including software instructions for generating a communication link between the low frequency transmission device and a tire pressure monitoring sensor, the software instructions being configured to cause the tire pressure monitoring sensor to communicate with a tire pressure monitoring system of a vehicle further comprising the step of downloading the identification information of the tire pressure monitoring sensor through the first and second communication links formed between the portable mobile wireless device and tire pressure monitoring sensor, proarramminq the portable mobile wireless device with software capable of determining a suitable program software for a tire pressure monitoring sensor of a particular vehicle; selecting a suitable program software from a database of program software with the portable mobile wireless device based upon identification information of the vehicle; and causing the tire pressure monitoring sensor to operate according to the selected suitable program software, wherein the identification information comprises the vehicle make, model, year of manufacture, vehicle identification number or combination thereof, wherein the portable mobile wireless device includes a user interface for initiating communication with a tire pressure monitoring sensor, communication with an electronic control unit of a vehicle, or both.

15. A system for integrating a tire pressure monitoring sensor with a tire pressure monitoring system of a vehicle, comprising: a portable mobile wireless device that is disposed outside the vehicle, the portable mobile wireless device having a memory device with suitable software for communicating with a tire pressure monitoring sensor; and a low frequency transmission device that is disposed outside the vehicle and is in communication with portable mobile wireless device through a first communication link, the low frequency transmission device being configured to form a second communication link with a tire pressure monitoring sensor, wherein through the low frequency transmission device establishes a third communication link with an electronic control unit disposed within the vehicle the portable mobile wireless device is configured to cause the tire pressure monitoring sensor to communicate with a tire pressure monitoring system of a vehicle, and wherein the portable mobile wireless device is configured to selectively couple and de-couple to the low frequency transmission device, further comprising the step of downloading the identification information of the tire pressure monitoring sensor through the first and second communication links formed between the portable mobile wireless device and tire pressure monitoring sensor, programming the portable mobile wireless device with software capable of determining a suitable program software for a tire pressure monitoring sensor of a particular vehicle; selecting a suitable program software from a database of program software with the portable mobile wireless device based upon identification information of the vehicle; and causing the tire pressure monitoring sensor to operate according to the selected suitable program software, wherein the identification information comprises the vehicle make, model, year of manufacture, vehicle identification number or combination thereof, wherein the portable mobile wireless device includes a user interface for initiating communication with a tire pressure monitoring sensor, communication with an electronic control unit of a vehicle, or both.

16. The system of claim 15, wherein the portable mobile wireless device comprises a cellular phone.

17. The system of claim 15, further comprising i) an on-board diagnostic connector, and ii) a wireless transmitter, receiver or both for forming a physical communication link between the portable mobile wireless device and a vehicle.

18. The system of claim 15, wherein the first communication link formed between portable mobile wireless device and the low frequency transmission device comprises a physical connection.

19. The system of claim 15, wherein the first communication link formed between the portable mobile wireless device and the low frequency transmission device comprises a wireless connection.

20. The system of claim 15, wherein an engagement is formed between portable mobile wireless device and low frequency transmission device to maintain a spatial relationship there between.

21. The system of claim 15, wherein the user interface is further configured for initiating communication between the tire pressure monitoring sensor and a tire pressure monitoring system of a vehicle.

22. The system of claim 15, further comprising a database of program software for tire pressure monitoring sensors, the portable mobile wireless device being adapted to configure a tire pressure monitoring sensor with a program software from the database of program software.

23. The system of claim 22, wherein the portable mobile wireless device includes software instructions for comparing vehicle identification with the database of program software and selecting a suitable program software for a particular vehicle.

24. The system of claim 23, wherein the software instructions are further configured to program the tire pressure monitoring sensor through the low frequency transmission device with the program software from the database of program software.

* * * * *